United States Patent Office 3,706,832
Patented Dec. 19, 1972

3,706,832
CERTAIN O-ALKYL-S-PHENYL-PHOSPHONO-
THIOLATE FUNGICIDES
Seiichi Hirane, Masahiro Aya, and Shigeo Kishino, Tokyo,
Japan, assignors to Nihon Tokushu Noyaku Seizo
Kabushiki Kaisha, Tokyo, Japan, and Farbenfabriken
Bayer Aktiengesellschaft, Leverkusen-Bayerwerk, Germany
No Drawing. Original application Jan. 22, 1968, Ser. No.
699,296, now Patent No. 3,560,596, dated Feb. 2,
1971. Divided and this application June 1, 1970, Ser.
No. 42,465
Int. Cl. A01n 9/36
U.S. Cl. 424—217                              12 Claims

ABSTRACT OF THE DISCLOSURE

A process is provided for treating blast (*Piricuralia oxyzae*), brown spot (*Cochliobolus miyabeanus*) and sheath blight (*Hypochnus sasakii*) in rice plants comprising applying to either the plant, the seed or the soil a horticultural and agricultural fungicide containing as active ingredient at least one O-alkyl S-phenylbenzylphosphonothiolate compound.

This is a division of our co-pending application Ser. No. 699,296 filed Jan. 22, 1968, now U.S. Pat. 3,560,596, issued Feb. 2, 1971.

The present invention relates to a method of using agricultural and horticultural fungicides whose active ingredients are organic phosphotiolates not containing heavy metals harmful to men and cattle, to prevent and treat blast (*Piricuralia oxyzae*), brown spot (*Cochliobolus miyabeanus*) and sheath blight (*Hypochnus sasakii*).

More particularly, the present invention relates to the use of agricultural and horticultural fungicides containing a fungicidal amount of at least one compound selected from the group consisting of O-alkyl S-phenyl benzyl phosphonothiolates represented by the following Formula I

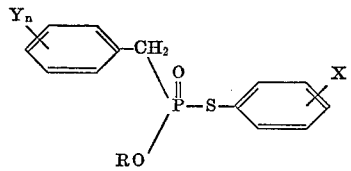

wherein R is a member selected from the group consisting of alkyl groups having up to 4 carbon atoms, X is a member selected from the group consisting of hydrogen, chlorine and methyl, Y is a member selected from the group consisting of hydrogen, chlorine, alkyl groups having up to 4 carbon atoms and alkoxy groups and n is 0, 1 or 2, as active ingredients.

Heretofore, compounds such as methyl arsonic acid metal salts, phenyl mercuric acetate, etc. have been used to effectively and cheaply control blast, and sheath blight.

Lately, the application of these heavy metal organic compounds to rice plants during their growing stages has fallen into disfavor because of these compounds residual toxic effect on the human body. Public health officials and others have been actively searching for agricultural chemicals which are as effective in controlling blast, brown spot and sheath blight in rice as heavy metal organic compounds mentioned above without any of their deleterious side effects, such as residual toxicity.

It has been discovered that the use of fungicides having the novel O-alkyl S-phenyl benzyl phosphothiolates having the above general formula as their active ingredient on rice plants, seeds and soil, efficiently controlled important rice diseases such as blast, brown spot and sheath blight.

The compounds useful in the process of this invention are listed in Table I.

TABLE I

| Compound | Structural formula | Chemical name |
|---|---|---|
| No. 1 | (phenyl)-CH₂-P(=O)(OCH₃)-S-(phenyl) | O-methyl S-phenyl benzyl phosphonothiolate. |
| No. 2 | (phenyl)-CH₂-P(=O)(OCH₃)-S-(phenyl)-CH₃ | O-methyl S-(4-methylphenyl) benzyl phosphonothiolate. |
| No. 3 | (phenyl)-CH₂-P(=O)(OC₂H₅)-S-(phenyl) | O-ethyl S-phenyl benzylphosphonothiolate. |
| No. 4 | (phenyl)-CH₂-P(=O)(OC₂H₅)-S-(phenyl)-CH₃ | O-ethyl S-(4-methylphenyl) benzylphosphonothiolate. |
| No. 5 | (phenyl)-CH₂-P(=O)(OCH(CH₃)₂)-S-(phenyl) | O-iso-propyl S-phenyl benzylphosphonothiolate. |
| No. 6 | Cl-(phenyl)-CH₂-P(=O)(OCH₃)-S-(phenyl) | O-methyl S-phenyl 4′-chlorobenzylphosphonothiolate. |
| No. 7 | Cl-(phenyl)-CH₂-P(=O)(OCH₃)-S-(phenyl)-CH₃ | O-methyl S-(4-methylphenyl) 4′-chlorobenzylphosphonothiolate. |

TABLE I—Continued

| Compound | Structural formula | Chemical name |
|---|---|---|
| No. 8 | | O-ethyl S-phenyl 4'-chlorobenzylphosphonothiolate. |
| No. 9 | | O-methyl S-(methylphenyl) 2',4'-dichlorobenzylphosphonothiolate. |
| No. 10 | | O-ethyl S-phenyl 2',4'-dichlorobenzylphosphonothiolate. |
| No. 11 | | O-methyl S-(4-chlorophenyl) benzylphosphonothiolate. |
| No. 12 | | O-ethyl S-(4-chlorophenyl) benzylphosphonothiolate. |
| No. 13 | | O-methyl S-(4-chlorophenyl) 4'-chlorobenzylphosphonothiolate. |
| No. 14 | | O-ethyl S-(4-chlorophenyl) 4'-chlorobenzylphosphonothiolate. |
| No. 15 | | O-methyl S-(4-chlorophenyl) 2',4'-dichlorobenzylphosphonothiolate. |
| No. 16 | | O-methyl S-(4-chlorophenyl) 3',4'-dichlorobenzylphosphonothiolate. |
| No. 17 | | O-methyl S-phenyl 4'-methylbenzylphosphonothiolate. |
| No. 18 | | O-methyl S-(4-chlorophenyl) 4'-methylbenzylphosphonothiolate. |
| No. 19 | | O-methyl S-(4-methylphenyl) 4'-methylbenzylphosphonothiolate. |
| No. 20 | | O-ethyl S-phenyl 4'-methylbenzylphosphonothiolate. |
| No. 21 | | O-methyl S-phenyl 4'-ethylbenzylphosphonothiolate. |
| No. 22 | | O-methyl S-phenyl 4'-methoxybenzylphosphonothiolate. |

The aforementioned such compounds may be easily produced by reacting benzylphosphonic acid alkyl ester chloride represented by the following formula:

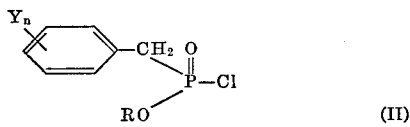

wherein R, Y and n are defined as in Formula I, with a compound represented by the following formula

wherein X is defined as in Formula I, and M is a member selected from the group consisting of hydrogen and an alkali metal.

The reaction proceeds as follows:

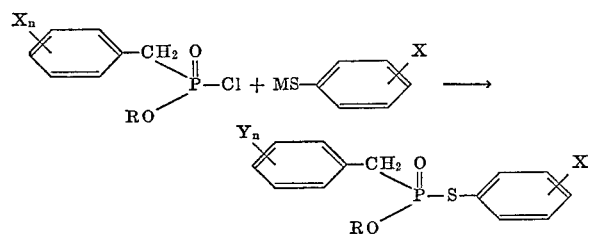

The reaction shown by the above reaction scheme reacts a compound of Formula II with a compound of Formula III. Although this reaction proceeds well with or without a solvent, it is preferable to use heat to speed the reaction.

This reaction may employ any of the common acid-binding agents such as an organic base, e.g., triethylamine, benzyldimethylamine, pyridine and 2-methyl-5-ethyl pyridine or an inorganic base, e.g., sodium carbonate, potassium carbonate, sodium bicarbonate and potassium bicarbonate. When a substituted or unsubstituted thiophenol is used in the above reaction, the use of an acid binding-agent is recommended.

The preferred reaction temperature is from 0° C. to 80° C., however, the reaction will proceed smoothly at temperatures higher or lower than the preferred range.

The following organic solvents may be used as the reaction medium, if desired, liquid hydrocarbons (benzene, xylene, hexane, etc.), liquid chlorinated hydrocarbons, ethers and ketones.

The reaction time is dependant on the temperature, components and other reaction condition, however, periods of from about one hour to 10 hours are normal.

Also, if necessary, the reaction may be carried out in a nitrogen atmosphere.

After completion of the reaction, the product may be isolated by filtering the reaction mixture, washing the filtrate with water or an aqueous solution of carbonic acid and drying with anhydrous sodium sulfate and distilling the filtrate to remove the solvent. Further purification is possible if a higher grade product is desired.

The compounds produced by the above process are oily substances, which are generally insoluble in water, but are soluble inorganic solvents, for instance, alcohols, benzene, xylene, hexane, ethers, ketones, chlorinated hydrocarbons and hydrocarbons.

In the process for using the compounds having the general Formula I as agricultural and horticultural fungicides, these compounds may either be diluted with water directly or in admixture with carriers and formulated into wettable powders, emulsifiable concentrates, dusts, granules or pastes by methods generally used in the agricultural chemical industry. Solid carriers which may be used, are exemplified by the following inactive materials: talc, clay, kaolin, montmorillonite, diatomaceous earth, calcium carbonate, etc. Liquid carriers may either be solvents or even non-solvents capable of dispersing or dissolving the active ingredient such as alcohol, benzene, xylene, dimethyl naphthalene, aromatic naphtha, dimethyl formamide, surface active agent, etc.

The fungicides can be applied in mixtures with adjuvants generally used by the agricultural chemical industry, such as spreaders, emulsifiers, wetting agents, adhesive agents, etc. Furthermore, these compounds can be applied in admixture with insecticides, acaricides and nematocides, such as organo-phosphorus compounds, carbamate compounds, chlorinated compounds, dinitro-compounds, other fungicides such as organophosphorus compounds, organic sulfur, copper compounds, dithiocarbamate compounds, dinitro-compounds, antibiotics, herbicides such as substituted phenoxy compounds, carbamate compounds, urea compounds, triazine compounds, chlorophenols, substituted diphenyl ethers, anilide compounds and other agricultural chemicals and fertilizers.

In the method of this invention, the novel fungicides can be directly dusted on the leaves or stems of plants or on the seed, when a powdered material is used, or it can be diluted or suspended in water, etc. to a desirable concentration and may be applied on leaves and stems of plants by spraying, if emulsifiable concentrates or wettable powders are used. The fungicides can also be applied by sprinkling on the soil directly or with a sprayer, if the fungicide compositions are granules.

To be effective fungicides, the compounds of this invention are generally applied at a ratio of 25 g.–100 g. preferably 40 g.–100 g., and especially 60 g.–80 g. of the active ingredients per 10 ares, however, if desired, smaller or larger amounts may be used. The amount used depends upon the kind of the active ingredients, the applying method, the applying period, object of application or formulation of fungicides.

The active ingredients (phosphonothiolates) used in the present invention have excellent fungicidal activity against *pirricuralia oxyzae*, *Cochliobolus miyabeanus* and *Hypochnus sasakii*, when compared with those compounds (phosphates) with the following formula:

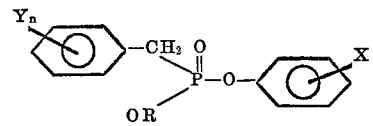

The fungicidal effect of these compounds are used as comparative examples.

The following examples are for the purpose of illustration only and are in no way to be deemed as limitative.

PRODUCTION OF THE ACTIVE INGREDIENTS

EXAMPLE A

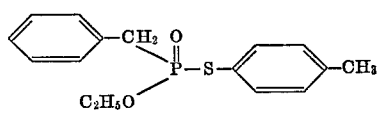

14.6 g. of benzylphosphonic acid ethyl ester chloride, 7.5 g. of 4-methylthiophenol were dissolved in 150 ml. of benzene. 6 g. of triethylamine was added to this mixture dropwise with cooling following by stirring for three hours at 60° C. After cooling, the benzene solution was washed with cold water and dried over anhydrous sodium sulfate. After distilling off the benzene at 150° C., and 0.1 mm. Hg, 14.9 g. of undistillable pale yellow oily O-ethyl 1-(4-methylphenyl) benzylphosphonothiolate remained.

PRODUCTION OF THE STARTING MATERIALS

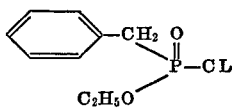

(A) 133.5 g. of aluminum trichloride was suspended in 303 g. of phosphorus trichloride and 63.3 g. of benzylchloride was added gradually with stirring and a uniform reaction mixture was obtained. After distilling off surplus phosphorus trichloride under reduced pressure, the mixture was dissolved in 4–6 times of dichloromethane. Water was added gradually at −20° C. to −15° C. until crystals of aluminum chloride hydrate separated. After the aluminum trichloride hydrate crystals were removed by filtration and dichloromethane was distilled off, 66 g. of benzylphosphonyl dichloride remained at 107°–8° C./0.4 mm. Hg.

26 g. of this benzylphosphonyldichloride was dissolved in 100 ml. of ether and cooled to 0° C. 6 g. of ethanol and 13 g. of triethylamine were dissolved in 100 ml. of ether and the mixed ether solution was added dropwise to the cooled ether solution with stirring below 0° C. After the completion of addition, stirring was continued at 0° C. for two hours and precipitate was removed by filtration. The filtrate was concentrated by distillation and the residue was distilled and 17.6 g. of benzylphosphonic acid ethyl ester chloride remained at 98° C./0.1 mm. Hg.

EXAMPLE B

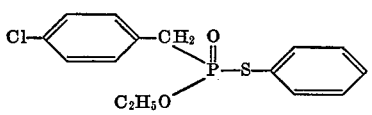

17.0 g. of 4-chlorobenzyl phosphonic acid ethyl ester chloride and 6.6 g. of thiophenol were dissolved in 150 ml. of benzene. 6 g. of triethylamine was added dropwise to this mixture with cooling and stirred for 10 hours at room temperature. Next, the benzene solution was washed with cold water and dried over anhydrous sodium sulfate after distilling off benzene, 15.1 g. of undistillable pale yellow oily O-ethyl S-phenyl 4'-chlorobenzylphosphonothiolate remained at 140° C./0.1 mm. Hg.

EXAMPLE C

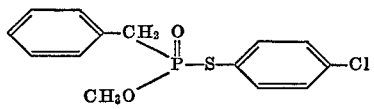

13.6 g. of benzylphosphonic acid methyl ester chloride and 8.7 g. of 4-chlorothiophenol were dissolved in 150 ml. of benzene. While cooling, 6 g. of triethylamine was added dropwise and the mixture was stirred for 2 hours at 70° C. After cooling, benzene solution was washed with cold water and dried over anhydrous sodium sulfate. Distilling off benzene, 14.4 g. of undistillable pale yellow oily O-methyl S-(4-chlorophenyl) benzylphosphonothiolate remained at 140° C./0.1 mm. Hg.

EXAMPLE D

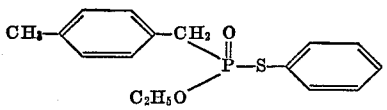

15.5 g. of 4-methylbenzylphosphonic acid ethyl ester chloride and 6.6 g. of thiophenol were dissolved in 160 ml. of benzene. 6.0 g. of triethylamine was added dropwise to this mixture with cooling followed by stirring for 10 hours at room temperature. Then benzene solution was washed with cold water and dried over anhydrous sodium sulfate. Distilling off benzene, 14.0 g. of undistillable pale yellow oily O-ethyl S-phenyl 4'-methylbenzylphosphonothiolate remained at 150° C./0.1 mm. Hg.

EXAMPLE 1

Tests against blast (Pot test)

Paddy rice (Jukkoku variety) was cultivated in pots 12 cm. in diameter and suspensions of test chemicals were sprayed on the rice plants at their young ear forming period. The treated rice plants were then kept in a greenhouse under the conditions of high humidity at the temperature of 25° C. for 48 hours. During that time the rice plants were sprayed twice with a suspension of spores of rice blast pathogen. The inoculated rice plants were kept in the greenhouse for 7 days and the disease attack rate per pot were classified in the degrees from 0 (no attack) to 5 (heavy attack) and valued.

The controlling values of the test chemicals were calculated out by the index numbers obtained from the disease attack rates to rice plant in the treated plots against those in the control plots.

The results of this test are listed in Table II along with comparison examples using other compounds.

TABLE II
The experimental results of fungicidal effect against blast (Pot Test)

| Compound:[1] | Concentration as a.i. (p.p.m.) | Rate of attack[2] | Phytotoxicity |
|---|---|---|---|
| No. 1 | 500 | 1.2 | — |
| No. 2 | 500 | 1.4 | — |
| No. 3 | 500 | 1.2 | — |
| O-ethyl O-(4-chlorophenyl) benzylphosphonate (comparison): | | | |
| No. 4 | 500 | 1.2 | — |
| No. 5 | 500 | 1.6 | — |
| No. 6 | 500 | 2.6 | — |
| No. 7 | 500 | 2.2 | — |
| No. 8 | 500 | 1.6 | — |
| No. 9 | 500 | 2.0 | — |
| No. 10 | 500 | 1.8 | — |
| No. 11 | 500 | 0.9 | — |
| No. 12 | 500 | 1.6 | — |
| O-ethyl, O-phenyl benzylphosphonate (comparison): | | | |
| No. 13 | 500 | 2.5 | — |
| No. 14 | 500 | 2.3 | — |
| No. 15 | 500 | 2.8 | — |
| No. 16 | 500 | 3.0 | — |
| No. 17 | 500 | 2.0 | — |
| No. 18 | 500 | 2.3 | — |
| No. 19 | 500 | 2.5 | — |
| No. 20 | 500 | 2.5 | — |
| No. 21 | 500 | 3.0 | — |
| No. 22 | 500 | 2.5 | — |
| Phenylmercuric acetate[3] | 20 | 1.5 | — |
| Non-treatment | | 5.0 | — |

[1] The numbers of compounds in this table are the same as those in Table I.
[2] The rate of attack in the table shows average value of 5 pots.
[3] Commercial product, comparison.

EXAMPLE 2

Test against plant pathogen (agar dilution method)

The test chemicals were mixed in the agar culture medium of potato making the concentration as prescribed. After the medium was poured into schales 9 cm. in diameter and coagulated, plant pathogens were inoculated. After having been cultured at 27° C. for 4 days, the growth condition of plant pathogens was investigated and the minimum concentration of growth inhibition was sought. The results are listed in Table III.

TABLE III

| Compound [1] | Piricuralia oxyzae, p.p.m.[2] | Cochliobolue miyabeanus, p.p.m.[2] | Hypochnus sasakii, p.p.m.[2] | Alternaria kikuchiana (pear), p.p.m.[2] | Mycosphaerella melonis (cucumber) p.p.m.[2] | Fusarium oxysporium, p.p.m.[2] |
|---|---|---|---|---|---|---|
| No. 1 | 50 | 200 | 100 | 200 | 100 | 100 |
| No. 2 | 100 | 200 | 200 | 200 | 100 | 100 |
| No. 3 | 50 | 200 | 100 | 200 | 100 | 100 |
| No. 4 | 100 | 500 | 200 | 200 | 100 | 100 |
| No. 5 | 100 | 500 | 200 | 200 | 100 | 100 |
| No. 6 | 100 | 500 | 200 | 200 | 100 | 100 |
| No. 7 | 200 | 200 | >200 | >200 | 100 | >100 |
| No. 7 | 50 | 200 | 100 | 200 | 100 | 100 |
| No. 9 | 200 | 500 | >200 | >200 | 100 | >100 |
| No. 10 | 200 | 500 | >200 | >200 | 100 | >100 |
| Zineb (standard) | 200 | 500 | >200 | >200 | 100 | >100 |
| No. 11 | 50 | >100 | 100 | >100 | 100 | 100 |
| No. 12 | 50 | >100 | 100 | >100 | 100 | 100 |
| No. 13 | 100 | >100 | >100 | >100 | 500 | 500 |
| No. 14 | 100 | >100 | >100 | >100 | 500 | 500 |
| No. 15 | 50 | 100 | >100 | 100 | 100 | 100 |
| No. 16 | 100 | >100 | >100 | 100 | 100 | 100 |
| No. 17 | 50 | >100 | 100 | >100 | 100 | 100 |
| No. 18 | 50 | 100 | 100 | 100 | 100 | 100 |
| No. 19 | 100 | >100 | >100 | >100 | 500 | 500 |
| No. 20 | 100 | >100 | >100 | >100 | 500 | 500 |
| No. 21 | 100 | >100 | >100 | >100 | 500 | 500 |
| No. 22 | 50 | 100 | >100 | 100 | 100 | 100 |
| Zineb (standard) | >100 | >100 | >100 | >100 | 500 | 500 |

[1] Compound numbers are the same as in Tables I & II.
[2] P.p.m. shows minimum growth inhibition concentration.

What is claimed is:

1. A process for controlling blast (*Piricuralia oxyzae*), brown spot (*Cochliobolus miyabeanus*) and sheath blight (*Hypochnus sasakii*) on rice plants which comprises applying to rice plants a fungicidal amount of a compound having the following formula:

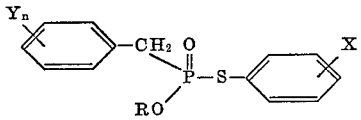

wherein R is alkyl of 1 to 4 carbon atoms, X is a member selected from the group consisting of hydrogen, chlorine and methyl, Y is a member selected from the group consisting of hydrogen, chlorine, alkyl of 1 to 4 carbon atoms and methoxy, and $n$ is 0, 1 or 2.

2. The process of claim 1, wherein said compound is applied in an amount of from 25 to 100 g. per 100 ares.

3. The process of claim 1 wherein said compound is applied in an amount of from 40 to 100 g. per 10 ares.

4. The process of claim 1 wherein said compound is applied in an amount of from 60 to 80 g. per 10 ares.

5. A process for controlling blast (*Piricuralia oxyzae*,) brown spot (*Cochliobolus miyabeanus*) and sheath blight (*Hypochnus sasakii*) on rise plants which comprises applying to rice seeds a fungicidal amount of a compound having the following formula

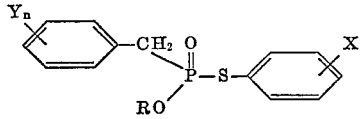

wherein R is alkyl of 1 to 4 carbon atoms, X is member selected from the group consisting of hydrogen, chlorine and methyl Y is a member selected from the group consisting of hydrogen, chlorine, alkyl of 1 to 4 carbon atoms and methoxy, and $n$ is 0, 1 or 2.

6. The process of claim 5, wherein said compound is applied in an amount of from 25 to 100 g. per 10 ares of soil sown with rice seeds.

7. The process of claim 5, wherein said compound is applied in an amount of from 40 to 100 g. per 10 ares of soil sown with rice seeds.

8. The process of claim 5, wherein said compound is applied in an amount of from 60 to 80 g. per 10 ares of soil sown with rice seeds.

9. A process for controlling blast (*Piricuralia oxyzae*), brown spot (*Cochliobolus miyabeanus*) and sheath blight (*Hypochnus sasakii*) on rice plants which comprises applying to the soil sown with rice seeds or having rice plants growing therein a fungicidal amount of a compound having the following formula:

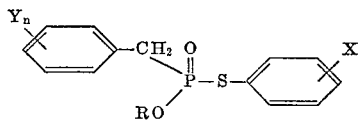

wherein R is alkyl of 1 to 4 carbon atoms, X is a member selected from the group consisting of hydrogen, chlorine and methyl, Y is a member selected from the group consisting of hydrogen, chlorine, alkyl of 1 to 4 carbon atoms and methoxy, and $n$ is 0, 1 or 2.

10. The process of claim 9, wherein said compound is applied in an amount of from 25 to 100 g. per 10 ares.

11. The process of claim 9, wherein said compound is applied in an amount of from 40 to 100 g. per 10 ares.

12. The process of claim 9, wherein said compound is applied in an amount of from 60 to 80 g. per 10 ares.

References Cited

UNITED STATES PATENTS

| 3,149,143 | 9/1964 | Newallis et al. | 260—961 |
| 3,472,932 | 10/1969 | Shindo et al. | 260—961 |
| 3,560,596 | 2/1971 | Hirane et al. | 260—951 |

ALBERT T. MEYERS, Primary Examiner

V. D. TURNER, Assistant Examiner

U.S. Cl. X.R.

424—222